(12) United States Patent
Fostick

(10) Patent No.: US 6,856,809 B2
(45) Date of Patent: Feb. 15, 2005

(54) SMS CONFERENCE

(75) Inventor: Gideon Fostick, Givat Shmuel (IL)

(73) Assignee: Comverse Ltd., Tel Aviv (IL)

( * ) Notice: Subject to any disclaimer, the term of this patent is extended or adjusted under 35 U.S.C. 154(b) by 721 days.

(21) Appl. No.: 09/858,955

(22) Filed: May 17, 2001

(65) Prior Publication Data

US 2002/0173319 A1 Nov. 21, 2002

(51) Int. Cl.[7] .............................. H04Q 7/20; H04Q 7/38
(52) U.S. Cl. .................... 455/466; 455/416; 455/414.1; 455/422.1; 455/414.4; 455/519; 379/202.01; 379/203.01; 379/204.01; 379/205.01
(58) Field of Search .............................. 455/403, 412.1, 455/412.2, 566, 550.1, 466, 416, 414.1, 414.4, 422.1, 458, 518, 517, 519; 379/157, 159, 202.01, 203.01, 204.01, 205.01

(56) References Cited

U.S. PATENT DOCUMENTS 6,275,575 B1 * 8/2001 Wu ........................ 379/202.01
6,289,223 B1 * 9/2001 Mukherjee et al. ......... 455/466
6,385,461 B1 * 5/2002 Raith ......................... 455/518
2001/0006889 A1 * 7/2001 Kraft ......................... 455/412

FOREIGN PATENT DOCUMENTS

EP          1164774 A1  * 10/2001    ............ H04M/3/56
GB          2327571 A   *  1/1999

* cited by examiner

*Primary Examiner*—William Trost
*Assistant Examiner*—Keith Ferguson
(74) *Attorney, Agent, or Firm*—Sughrue Mion, PLLC

(57) ABSTRACT

A method, computer system, computer program product, and user interface for enabling SMS users to engage in many-to-many conversation, or an SMS conference, utilizing SMS services. Specifically, a user initiates an SMS conference by sending a short message, including the contact numbers for a group of conference participants, to a control center. The control center establishes an SMS conference by storing the contact information as a conference group and assigning a unique identifier to the conference group. Thus, the SMSC establishes an SMS conference by associating the conference group with a unique identifier. The SMSC transmits the short message from the conference initiator to each participant. A participant is able to send a message to all conference participants by addressing the message to the unique identifier. The control center then forwards the message to each participant in the conference as indicated by the unique identifier.

37 Claims, 6 Drawing Sheets

SMS CONFERENCE

BACKGROUND OF THE INVENTION

1. Field of the Invention

The present invention relates generally to wireless communication systems and more specifically to a wireless system that enables many-to-many communications via short message services ("SMS").

2. Description of Related Art

In today's competitive environment, access to immediate information is mandatory. People covet access to instantaneous information and more particularly, people want to be constantly available to others. Over the past decade, the telecommunication revolution has cultivated the demand for instant information and constant contact with endless innovative methods. For example, the wireless industry initially introduced pagers that enabled people to contact one another by sending a numeric message to another's pager wherein the person receiving the page answered the page by calling the number displayed on the pager. As paging technology developed, information, in the form of alphanumeric text, was also received and reviewed using a pager. The communication revolution, however, exploded with the advent of wireless or cellular telephones.

Wireless telephones offer many communication advantages over prior wireless devices such as the pager. First and foremost, wireless telephones enable people to carry on two-way, and in some cases three way, conversations. Thus, once a person has contacted another person over a wireless phone, the conversation is immediate, thereby eliminating the need to wait for the contacted person to return a call, as in the case of a pager.

Initially, analog cellular services, also known as advanced mobile phone services ("AMPS"), were implemented as a standard format in the United States so that all telephones utilized analog cellular networks. However, as analog services became more popular, capacity was not adequate for future growth. As a result, digital cellular multiplexing technologies were developed to provide the much needed additional capacity.

Upon implementation, digital cellular services introduced advanced features into the wireless market that further assisted customers' needs for constant availability and receipt of instantaneous information. Such features included call forwarding and three-way calling. In particular, digital cellular services introduced integrated voice and text communication features over a wireless phone, such as caller ID and paging services. A particular type of text communication service, known as Short Message Service ("SMS"), enables individuals to send and receive short text messages, via a wireless device, on communication channels that are usually separate from a voice call channel.

SMS is a globally accepted wireless service that facilitates the transmission of alphanumeric messages between mobile subscribers and external systems such as electronic mail, paging and voice mail systems. SMS was developed in Europe in the early 1990s. Initially, SMS was only available using the European standards for digital wireless known as global standard for mobiles ("GSM"), however SMS is now compatible with U.S. wireless communication networks utilizing accessing technologies such as code division multiple access ("CDMA") and time division multiple access ("TDMA").

The advent of digital cellular, and more particularly SMS, provides numerous benefits to the wireless world that were previously unavailable, thus aiding the population's need for constant information and constant availability. For example, SMS messages do not require a wireless phone to be activated or within range in order to handle a message. In an instance where the receiving phone is not available, the SMS message is stored in an SMS message center for a number of days until the mobile phone is once again active. A further distinguishing characteristic of SMS is that an active wireless phone is able to receive or submit a short message independent of whether or not a voice or data call is in progress. Thus, SMS differs from traditional paging services in that SMS is designed to guarantee immediate delivery of text messages to the proper destinations and further provides flexible, seamless integration of messaging services and data access.

SMS, however, is traditionally a point-to-point, or one-to-one communication method. In transmitting messages, an SMS message is transmitted from a wireless phone or computer to a short message service center ("SMSC"), which acts as a store and forward system for short messages. The wireless network then provides for the transmission of SMS messages between the SMSC and the receiving wireless phone. An SMS message can only be sent by one individual and received by one individual, thereby enabling two persons to have a one-to-one conversation. Conventional SMS services are consequently not capable of engaging in many-to-many communications. If a person needs to contact a group of individuals using SMS services, the person is required to send a separate short message to each individual in the group. There are, however, implementations of an "SMS distribution list," that provides a one-to-many communication function, but does not provide a many-to-many communication function. The lack of a many-to-many communication function, utilizing SMS, severely limits the effectiveness and efficiency of SMS services.

SUMMARY OF THE INVENTION

It is therefore preferable to provide a means for enabling SMS users to engage in many-to-many conversations. The present invention provides a system that supports many-to-many conversations via SMS, thereby creating a virtual SMS conference among a group of conference participants, each of whom may transmit SMS messages to other conference participants via a single SMS message.

The present invention solves the above-described limitations of SMS systems by enabling SMS users to engage in many-to-many conversations, or an SMS conference, utilizing SMS services. Specifically, a user initiates an SMS conference by sending a short conference initiation message or request, via a designated SMS conference phone number, to a control center, or more specifically, to the SMS control center (SMSC). The user's conference initiation message includes the names and contact numbers of all conference participants. The SMSC establishes an SMS conference by temporarily storing the contact information for each conference participant, as a conference group, in the SMS conference center (SMSCC). The SMSCC further assigns a unique identifier to the conference group.

The SMSC then sends a message to each conference group participant inviting them to participate in the SMS conference. At this point, each conference participant receives an SMS message informing them of the pending SMS conference and the names of the other conference participants. Each conference participant can communicate via SMS with the other participants by sending a single SMS message, using a unique identifier, to the SMSC. Upon receiving the incoming message, the SMSCC, located within the SMSC, matches the unique identifier to the appropriate conference group. The message is forwarded to all conference group participants associated with the unique identifier.

In one embodiment, the SMSCC permanently stores "conference groups," each listing the contact numbers for a plurality of conference participants. An SMS conference user may initiate a conference by simply including the name or identification code of the stored conference group in the SMS message. Thus, the SMSCC acts as an "address book" by storing participant contact information in predefined conference groups such that a conference initiator is not required to manually input conference participant information.

In yet another embodiment of the present invention, the SMS system is implemented over a wireless system. The SMS conference may be initiated using numerous methods, including but not limited to: initiating the SMS conference from a computer via a LAN, the Internet, or using a wireline or wireless device. Furthermore, the SMS conference of the present invention may be initiated via a web-based interface, (such as an HTML form, wherein the conference initiator enters the participant's contact information), via an email request or through instant messaging services (such as ICQ or AOL Instant Messenger). In addition, initiation of an SMS conference may be implemented using a telephony-user interface wherein the user dials into a voice-based service (such as IVR) and then enters the various contact information for each participant, thereby initiating as SMS conference.

It should be noted that an SMS conference initiation message is distinguishable from a conventional SMS message because the SMS conference message is sent to a dedicated SMS conference number assigned exclusively to the SMSCC. Of course, the dedicated number may be shared with other services thereby requiring the conference initiator to enter a password to distinguish an initiating SMS conference message from a conventional SMS message.

In another embodiment of the present invention, WAP may be utilized as the initiation system to request an SMS conference. WAP may also be used as the medium for conference communications.

Further objects, features and advantages of the invention will become apparent from a consideration of the following description and the appended claims when taken in connection with the accompanying drawings.

BRIEF DESCRIPTION OF THE DRAWINGS

The above aspects of the present invention will become more apparent by describing in detail embodiments thereof with reference to the attached drawings, in which.

DETAILED DESCRIPTION OF THE PREFERRED EMBODIMENTS

Figure 1:
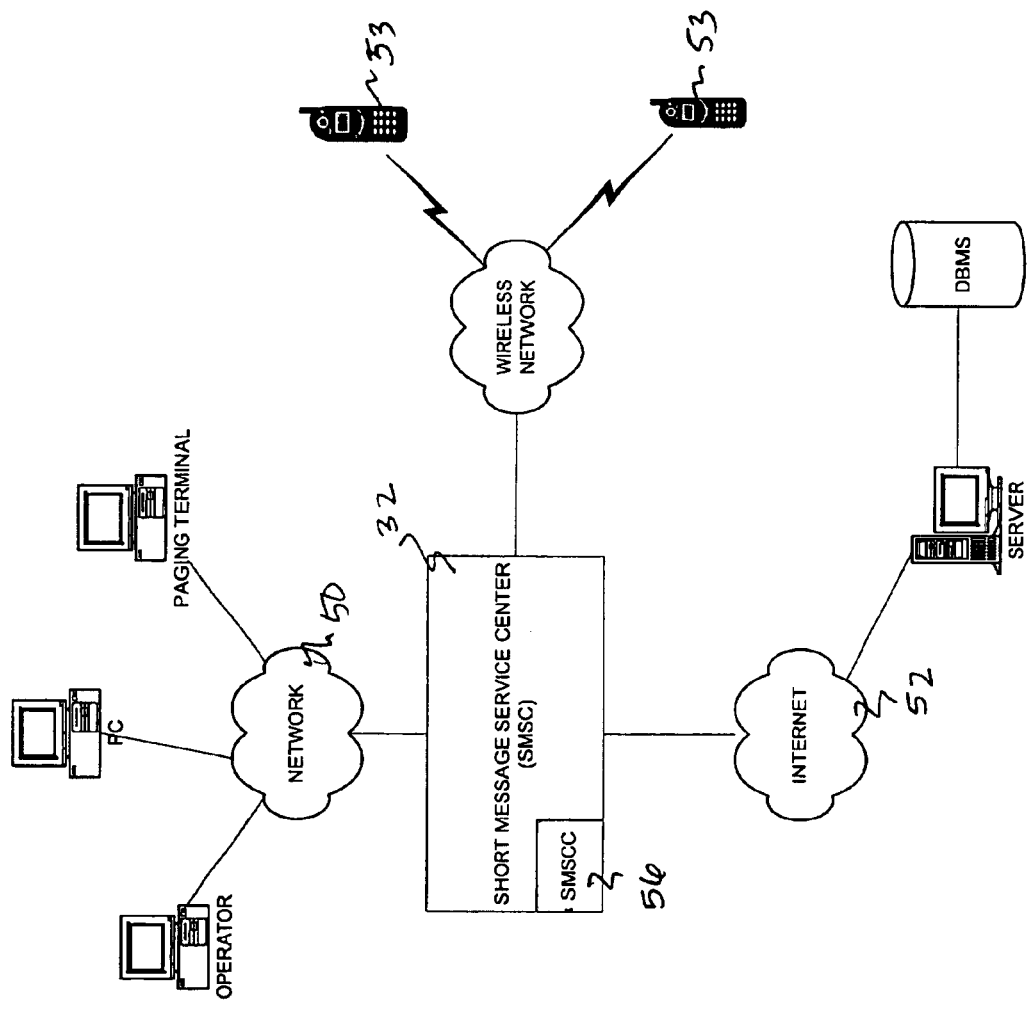
FIG. 1 is a block diagram of a short message service center ("SMSC") network infrastructure of the present invention.

Hereinafter, embodiments of the present invention will be described in detail with reference to the attached drawings. The present invention is not restricted to the following embodiments, and many variations are possible within the spirit and scope of the present invention. The embodiments of the present invention are provided in order to more completely explain the present invention to one skilled in the art.

Definitions

One embodiment of this invention resides in a computer system. Here, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment or even in geographically distinct locations.

Computer Program Products

The above-identified invention may be embodied in a computer program product, as will now be explained.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media", or "computer-readable media", as used here, may include a diskette, a tape, a compact disc, an integrated circuit, a ROM, a CD, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears in any form of software to enable a computer system to operate according to the above-identified invention.

Thus, the invention is also embodied in a program product bearing software which enables a computer to perform * according to the invention.

User Interfaces

The invention is also embodied in a user interface invocable by an application program. A user interface may be understood to mean any hardware, software, or combination of hardware and software that allows a user to interact with a computer system. For the purposes of this discussion, a user interface will be understood to include one or more user interface objects. User interface objects may include display regions, user activatable regions, and the like.

As is well understood, a display region is a region of a user interface that displays information to the user. A user activatable region is a region of a user interface, such as a button or a menu, which allows the user to take some action with respect to the user interface.

A user interface may be invoked by an application program. When an application program invokes a user interface, it is typically for the purpose of interacting with a user. It is not necessary, however, for the purposes of this invention, that an actual user ever interact with the user interface. It is also not necessary, for the purposes of this invention, that the interaction with the user interface be performed by an actual user. That is to say, it is foreseen that the user interface may have interaction with another program, such as a program created using macro programming language statements that simulate the actions of a user with respect to the user interface.

Applications Programs

An application program may be several separate programs, only one program, a module of a program, or even a particular task of a module.

An applications program may be written by an applications programmer. Applications programmers develop applications programs using any of a number of programming languages. During development and design of applications programs, applications programmers may adhere to a programming methodology. A programming methodology is a set of principles by which analysis is performed and by which design decisions are made. Programming methodologies may be referred to as programming paradigms. Examples of widely-known programming paradigms include the top-down, the data-driven, and the object oriented (OO) programming paradigms.

Having explained the meaning of various terms, preferred embodiments of the invention will now be described in detail. The SMS conference system of the present invention may be implemented using terrestrial or satellite based wireless telecommunication systems, in addition to the several types of wireless telecommunication networks in operation today. For example, the SMS conference system of the present invention may be implemented utilizing various accessing technologies such as time division multiple access ("TDMA"), code division multiple access ("CDMA") and the European standard global system for mobile communications ("GMS"), which employs TDMA. The SMS conference system of the present invention may be implemented on any network architecture and should not be limited to those identified herein.

Referring now to FIG. 1, a block diagram illustrates the integral components of the SMSC (32) that embody the present invention. The SMSC (32) is responsible for relaying, storing and forwarding short messages between a short message service entity and a mobile station. As depicted in FIG. 1, a short message service entity, from which a short message may be sent or received, includes but is not limited to; computers and servers on a wireline network (50), computers and servers adapted to the Internet (52), any internal system and wireless network devices (53).

In a preferred embodiment, as seen in FIG. 1, the SMS conference system of the present invention may be implemented as a functional module (56) in the SMSC. In an another preferred embodiment, the SMS conference system of the present invention may be implemented as the entire SMS conference system as shown in FIG. 1, wherein the conferencing system includes the message originating, receiving and terminating devices, and all the components therebetween.

In yet another preferred embodiment, the SMS conferencing system of the present invention may be embodied in a software package for downloading thereby enabling the conference system of the present invention to be utilized with various devices. The software package may be written in numerous programming languages, including, but not limited, to Java. Furthermore, the software package embodiment may employ numerous types of data structures to organize the information housed in a corresponding database utilized by the system. SMS conference information is organized within the database by conference groups, time of conference expiration, and a unique identifier. The database may be implemented using database software including, but not limited to, Oracle database software. Thus, the software package of the SMS conference system enables short messages to be sent and received by a multitude of short service entities as described below.

Figure 2:
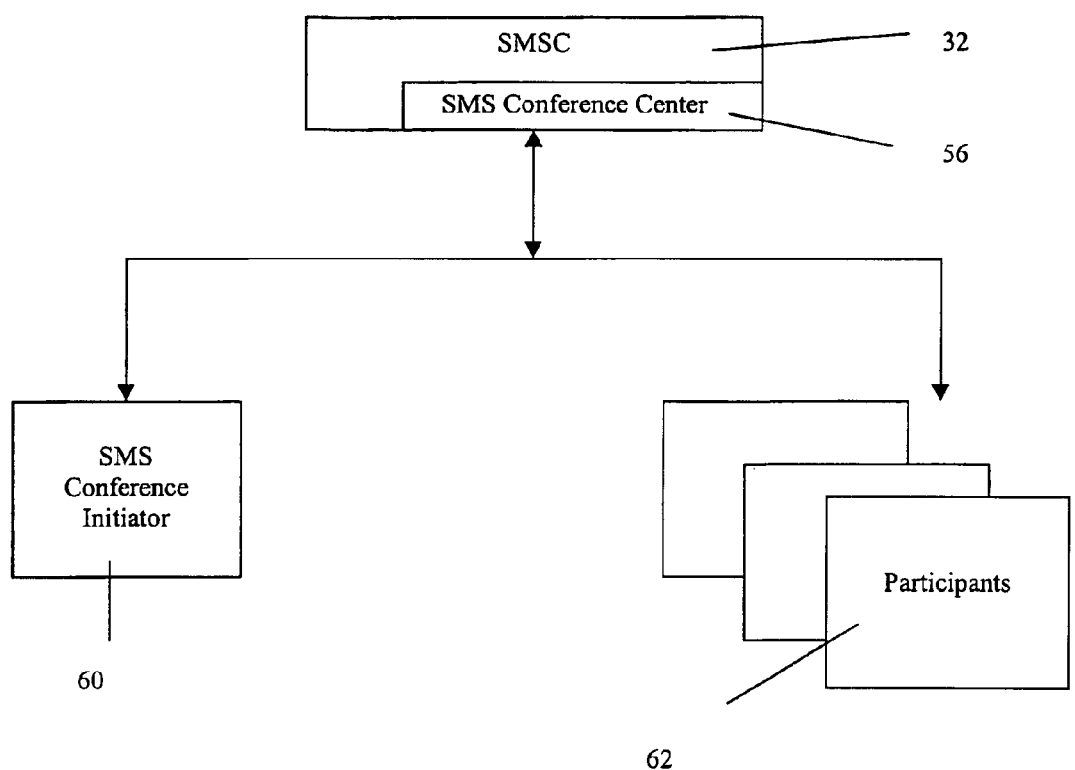
FIG. 2 is a diagram of the relationship between the SMSC and the conference participants.
Figure 3:
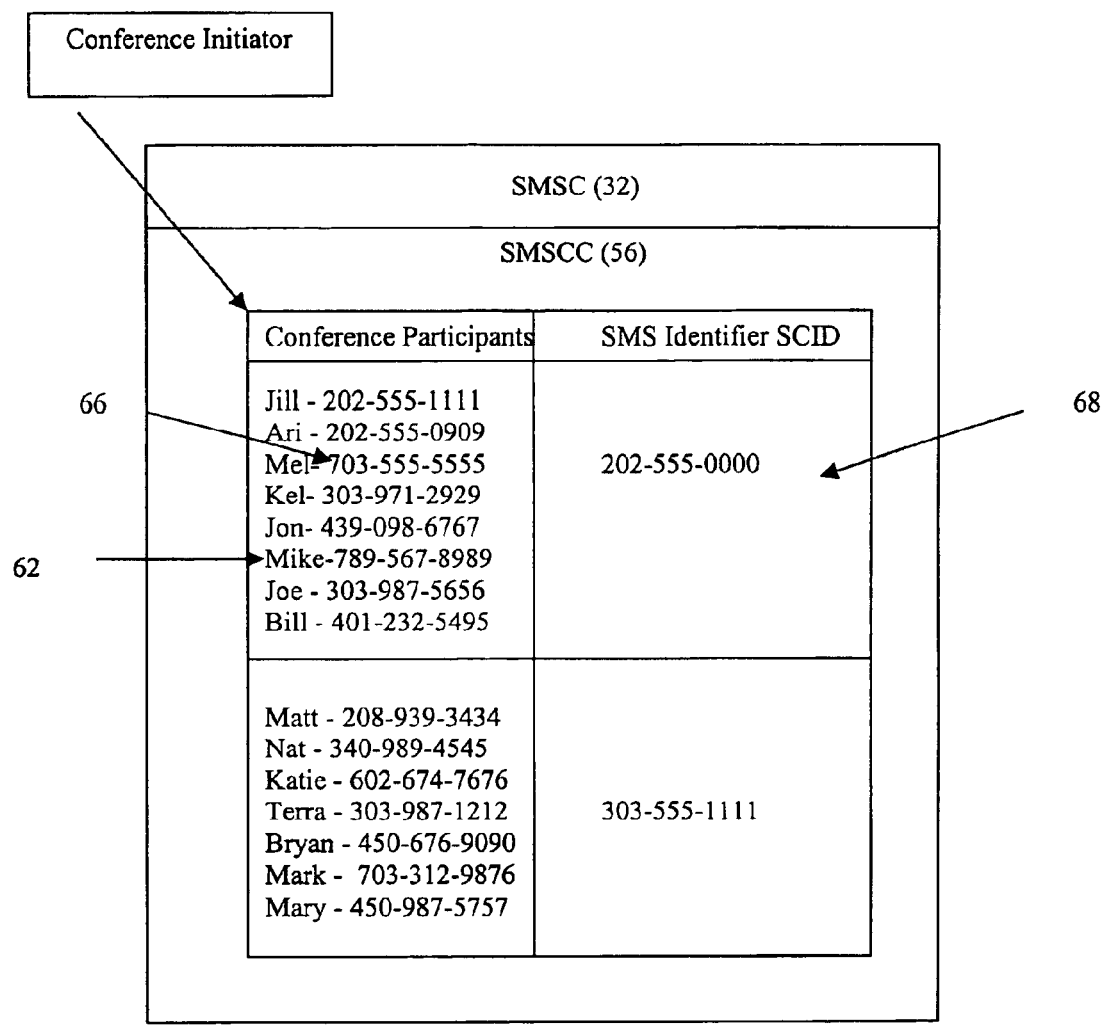
FIG. 3 is a block diagram of the structure of the SMS Conference Center of the present invention

FIGS. 2 and 3 will be addressed in conjunction with one another to illustrate the procedures of initiating an SMS conference. Specifically, the SMS conference system of the present invention facilitates many-to-many communications via SMS technology. An SMS conference is initiated by a SMS conference initiator (60) as shown in FIGS. 2 and 3. The SMS conference initiator (60) may be, for example, a user on a mobile handset, or a user at any other terminal shown in FIG. 1. Generally, the SMS conference initiator (60) sends a short message to the SMSC (32). The conference initiator's (60) short message may include an invitation to the conference and a list of individuals, whom the conference initiator (60) prefers to invite into the conference as conference participants (62). Alternatively, the conference initiator's (60) original SMS may include an initial message that will subsequently be forwarded on to each conference participant (62) by the SMSC (32). Furthermore, instead of forwarding the conference initiator's (60) original SMS message, the SMSCC (56) may generate a new message and send it to each conference participant (62) to notify the conference participants (62) that they are invited to participate in a conference.

To initiate an SMS conference, for example, the conference initiator (60) enters into a standard SMS message the names and phone numbers of each person whom the conference initiator (60) would like to invite into the conference. The conference initiator (60) transmits the SMS message to the SMSC (32) using a dedicated phone number exclusively assigned to the SMSCC (56). The dedicated phone number allows the SMSC (32) to distinguish an SMS conference message from a conventional SMS message. If, however, the number is shared with other services, the conference initiator (60) may include a password to help identify the SMS message as an SMS conference initiation message.

It is important to note that the SMSC (32) may, in one embodiment, act as a "dumb pipe" wherein the SMSC (32) simply forwards messages to the designated address. In this specific embodiment, the SMSCC (56) is responsible for the entire SMS conference application. Thus the SMSCC (56) may receive the initiation message, assign the SCID (68), send initiation messages to all participants (62) and subsequently receive and forward all SMS conference messages. Alternatively, the SMSCC (56) may be installed as part of the SMSC (32) wherein the SMSC (32) is primarily responsible for forwarding and receiving SMS conference messages. In short, SMS conference messages may be received from conference participants (62) and forwarded to conference participants (62) by both the SMSC (32) and the SMSCC (56).

To avoid manually typing in the contact information for each possible conference participant (62), the conference initiator (60) may alternatively use an SMS message to forward a distribution list to the SMSC (32). A distribution list is typically a personal list of names and contact information stored under a specific title in a short message entity such as a computer, mobile phone or an electronic organizer. The conference initiator (60), using a short message entity such as a mobile phone or computer, may simply select the names of possible conference participants (62) from an address book and attach the selected contact information to the SMS message for initiating an SMS conference.

Furthermore, to facilitate the entry of possible conference participants (62) into the initial SMS conference message, software may be installed on the short message entity. For example, software may be installed on a cellular phone that would assist the conference initiator (60) in organizing the names and numbers of the conference participants (62). As described above, the software may also offer a distribution list or address book feature.

Referring now to FIG. 3, the organization of conference participants and their respective contact information is shown. Upon entering the contact information (66) for each conference participant (62), using one of the methods described above, the conference initiator (60) transmits the SMS message, via a designated phone number, to the SMS conference center (SMSCC) (56) in the SMSC (32). The contact information (66) for a conference participant (62) may include, but is not limited to: MSiSDN numbers, short nicknames associated with a particular MSiSDN, web addresses and various other protocols for contacting a conference participant (62). An MSiSDN is a digital telecommunication line, often used with wireless phones, that transmits both voice and digital network services up to 128 K and are therefore much faster and more reliable than high-speed analog modems. The SMSCC (56) stores the contact information (66) as a group of conference participants. The SMSCC (56) assigns the conference group a unique identifier (68) or a SMS conference identifier (SCID). As depicted in FIG. 3, the first conference group is assigned 202-555-0000 as an SCID (68) while the second conference group is assigned 303-555-1111 as an SCID (68).

The assigned SCID (68) is typically a phone number or MSiSDN that the SMSCC (56) uses to identify the conference group to which the incoming and outgoing message belongs. In addition to a phone or MSiSDN, the SCID (68) may also be a dedicated short code such as 122334 or *9654. The SMSCC (56) may have a reserved quantity of phone numbers that act as a unique SCID (68). In this light, once an SMS conference terminates due to lack of use or expiration of a predetermined time period, the phone number may be recycled and used again as an SCID (68) to identify another SMS conference group.

Alternatively, the SCID (68) may be the conference initiator's (60) phone number or MSiSDN. The contact information (66) would be organized and stored using the initiator's phone number or MSiSDN as the SCID (68), thereby providing an unlimited number of SCID's (68).

Once the SCID (68) is assigned to a conference group, the SMSC (32) transmits an invitation to each conference participant (62) thereby notifying the conference participants (62) of the SMS conference. The invitation also identifies the other conference participants (62) partaking in the SMS conference, in addition to the SCID (68) assigned to the SMS conference. Specifically, the SMSC (32) forwards the invitation to each conference participant (62) using the conference participant's (62) actual contact information (66). Each conference participant (62), however, will view the incoming SMS conference invitation as originating from the SCID (68). Alternatively, instead of forwarding an SMS conference invitation, the SMSC (32) may forward the conference initiator's (60) original message in addition to the names of other conference participants (62) and the conference group SCID (68).

An example of the above-discussed SMS conference initiation is depicted in FIG. 3. Specifically, the conference initiator (60) manually enters Jill's name and her contact information (66) 202-555-1111 into a mobile phone. Accordingly, the conference initiator (60) enters the other conference participant (62) names and respective contact information (66). The conference initiator (60) then transmits the SMS message, using a designated SMS conference number, to the SMSCC (56) located in the SMSC (32). The SMSCC (56) stores the conference participant's (62) names and contact information (66) as a conference group and assigns the conference group an SCID (68), respectively, 202-555-0000.

The SMSC (32) forwards the conference initiator's (60) original message or a conference invitation to each conference participant. More specifically, the SMSC (32) forwards the SMS conference invitation to Jill's contact number 202-555-1111 as stored in the SMSCC (56). Jill, however, views the incoming message as originating from the SCID (68) 202-555-0000. Upon receipt of the conference invitation, Jill is automatically informed that Ari, Mel, Kel, Jon, Mike, Joe and Bill are conference participants. Furthermore, the conference invitation also informs Jill that the SCID (68) for the SMS conference is 202-555-0000. For example, Jill may receive a conference invitation via SMS that reads:

"Jill, you have been invited by Rob to join an SMS conference. Other participants include Ari, Mel, Kel, Jon, Mike, Joe and Bill. Please send conference messages to 202-555-0000."

As indicated in the received message, Jill is required to address all SMS conference related messages to the SCID (68) 202-555-0000. Thus, if Jill decides to send an SMS message to the conference group, Jill simply addresses her SMS message to the SCID (68) 202-555-0000. The SMSC (32) receives Jill's incoming call and queries the SMSCC (56) for the conference group with an assigned SCID (68) that matches the SCID (68) Jill used to send her SMS message. Upon finding a conference group having the SCID (68) equal to 202-555-0000, the SMSC (32) forwards Jill's message to each of the listed conference group participants (62). Therefore, the SMSC (32) will forward Jill's message to Ari, Mel, Kel, Jon, Mike, Joe and Bill. Each of the conference participants (62) will also view Jill's message as being from the conference group SCID (68), respectively, 202-555-0000. Specifically, the SMSC (32) will forward the SMS message to Ari using her stored contact information (66). Thus, the SMSC (32) forwards the message to 202-555-0909. Ari, however, will view the incoming message number as 202-555-0000

The SCID (68) provides conference participant's (66) with a single unique number to which all SMS messages are addressed. When an SMS message, addressed to an SCID (68), is received by the SMSC (32), the SMSC (32) will query the SMSCC (56) to find the conference group participants (62) to which the SCID (68) is assigned. Once the matching conference group and contact information (66) is located, the SMSCC (56) addresses the SMS messages to the conference participant's (62) listed contact number (66). The SMSC (32) forwards the message using the SCID (68) such that all conference participant's (62) identify the unique SCID (68) as an indicator of a SMS conference message as opposed to a conventional SMS message.

In a preferred embodiment of the present invention, a participant (62) who receives a message using the SCID (68) may address a "decline message" to the SCID (68). The conference participant (62) is then removed from the conference list. Of course, an optional message may be sent to the remaining conference participants (62) informing them of the participant's decline to participate. In short, use of the SCID (68) enables conference participants (62) to send a single message to a plurality of participants as will be explained in greater detail below.

In one embodiment, the introductory message received by each conference participant (62) inviting them to participate in an SMS conference may include instructions for declining the SMS conference invitation. There are many methods for implementing a decline option such as a dedicated key or code that alerts the SMSCC (56) that the participant declines to participate in the conference. Furthermore, a conference participant may decline to participate in the conference at any time.

Figure 4:
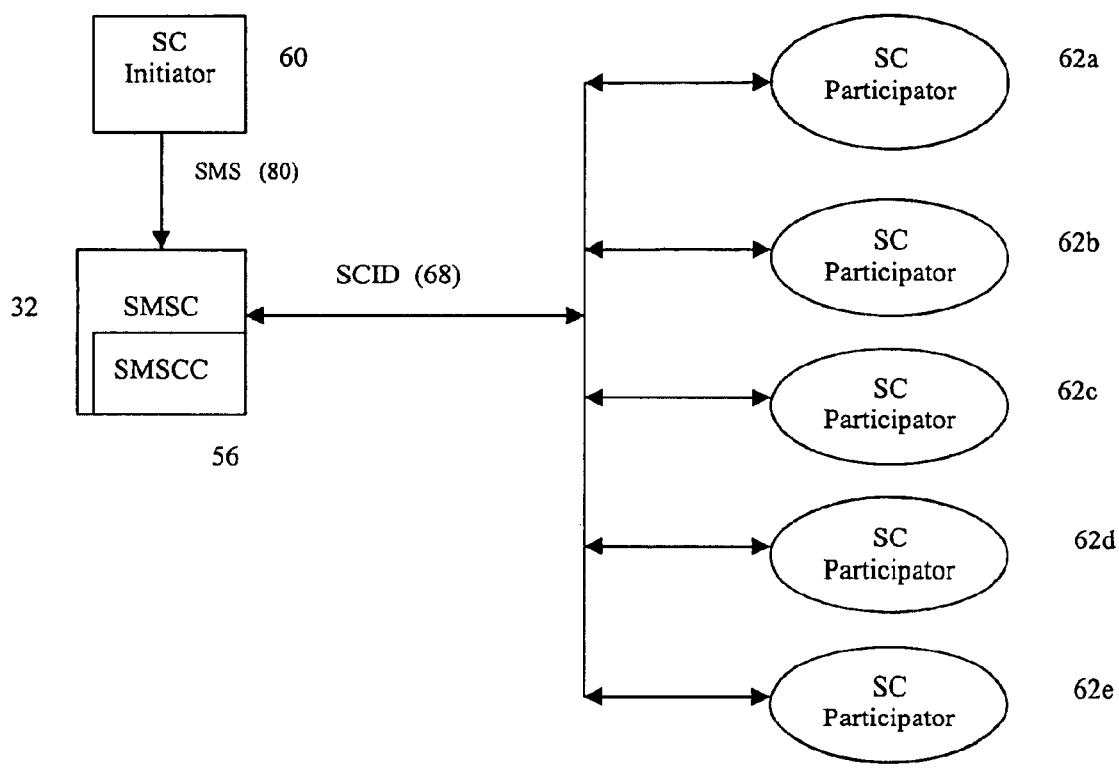
FIG. 4 is a diagram illustrating the transmission of an SMS message according to the present invention.

Turning now to FIG. 4, the SMS conference of the present invention that enables many-to-many communication using a unique SMS conference identifier is shown. As described above, the conference initiator (60) sends a SMS message (80), having contact information for a plurality of conference participants (62), to the SMSC (32). The SMSCC (56), located within the SMSC (32), stores the contact information of the conference group participants (62) and assigns a unique SCID (68) to the conference group. The SMSCC (56) may or may not be implemented as an internal module within the SMSC (32). If not, then the SMSC (32) relays all messages relating to the SMS conference to the SMSCC (56), and the SMSCC (56) sets up and manages the conference. In this case, the SMSC (32) serves as a transparent transfer point with no knowledge of the existence of the conference.

The unique SCID (68) is then used to forward the short message from the conference initiator (60) to the conference participants (62). A conference participant (62) receiving the message sees the message as coming from the SCID (68). It should be noted however, that many alternatives exist as to how a conference participant (62) may be notified of the SMS conference. For example, instead of seeing the SCID (68), conference participants (62) may view the name of the conference initiator (60), other conference participants or a conference name. Each of these options and any equivalents are fully within the scope of this invention.

All conference participants (62), however, may send a short message to other conference participants (60 and 62a-e) by addressing an SMS message (80) to the unique SCID (68), as indicated by the two-way arrow. The SMSC (32) receives the short message and transmits the received message to the SMSCC (56). The SMSCC (56) identifies the conference group associated with the SCID (68) and then forwards the short message to the conference participants (62), using their stored contact information as described in relation to FIG. 3. Because the SMSC (32) and SMSCC (56) forward SMS conference messages using the conference participants (62) actual contact information, the SMSCC (56) initially matches incoming messages addressed to a specific SCID (68) with stored SCID's associated with conference groups. Upon finding a match, the SMSCC (56) then matches the message senders actual contact information (66) with the contact information stored in the SMSCC (56), thus allowing the received SMS message to be forwarded to all conference participants (62) other than the originator of the message. Therefore, a many-to-many communication medium is available via SMS using the system of the present invention.

Figure 5:
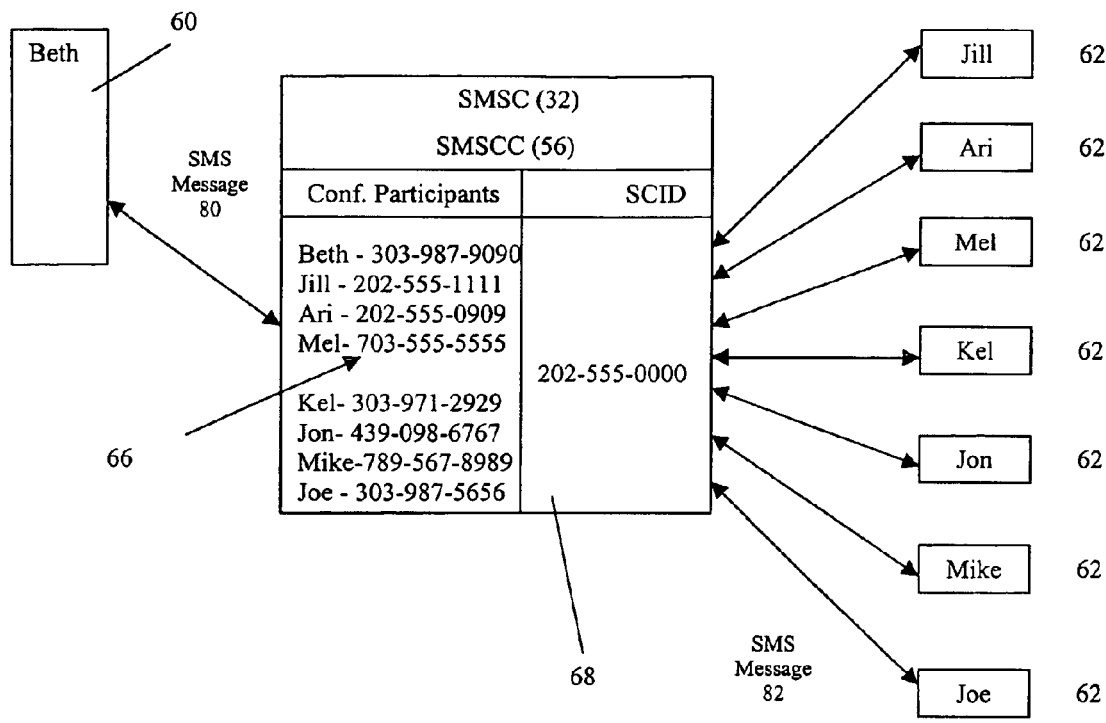
FIG. 5 is a block diagram illustrating an exemplary embodiment of the SMS conference system of the present invention.

FIG. 5 illustrates an exemplary embodiment of the present invention. For example, Beth, wanting to gather her friends together for a 9:00 movie, decides to initiate an SMS conference in order to make plans for the movie. As conference initiator (60), Beth sends a short message (80) to the SMCS (32) by addressing the SMS message (80) to the designated SMS conference phone or MSiSDN number. In Beth's original short message (80), Beth manually enters the contact names and/or numbers (66) of each friend she would like to invite into the SMS conference as a conference participant (62). In this example, Beth has identified Jill, Ari, Mel, Kel, Jon, Mike and Joe as conference participants (62).

Upon receipt of Beth's short message (80), the SMSCC (56) of the SMSC (32) stores the contact numbers for Jill, Ari, Mel, Kel, Jon, Mike and Joe (66) as a conference group in a database. The SMSCC (56) then assigns a unique SCID (68) to the stored conference group thereby creating a SMS conference. In this example, the unique SCID (68) assigned to the conference initiated by Beth is "202-555-0000." The SMSCC (56) then forwards Beth's original short message (80) to Jill, Ari, Mel, Kel, Jon, Mike and Joe using the contact information stored for each conference participant (62). In this scenario, each conference participant (62) receives Beth's original short message (80), a list of other conference participants (62) and the designated conference SCID (68).

Using the SMS conference system of the present invention enables Jill, Ari, Mel, Kel, Jon, Mike, Beth and Joe (62), to send a single short message (82) that is received by everyone in the SMS conference. Thus, if Joe sends a short message (82) specifying which movie he would like to see, Joe simply addresses the short message (82) to the SCID (68), specifically, 202-555-0000. Upon receipt of Joe's short message (82), the SMSCC (56) identifies the conference group associated with the unique SCID 202-555-0000 (68) and the associated contact information (66) for each conference group participant (62). Upon locating the contact information (66) for the specific conference group, the SMSCC (56) forwards Joe's message (82) to Jill, Ari, Mel, Kel, Jon, Mike (62) and Beth (60). Alternatively, by simply replying to the message sent by the SCID (68), Joe's reply is automatically sent to all conference participants (62). Thus, the SMS conference of the present invention enables many-to-many communication via SMS as opposed to the conventional SMS system, which only enable point-to-point communication.

Figure 6:
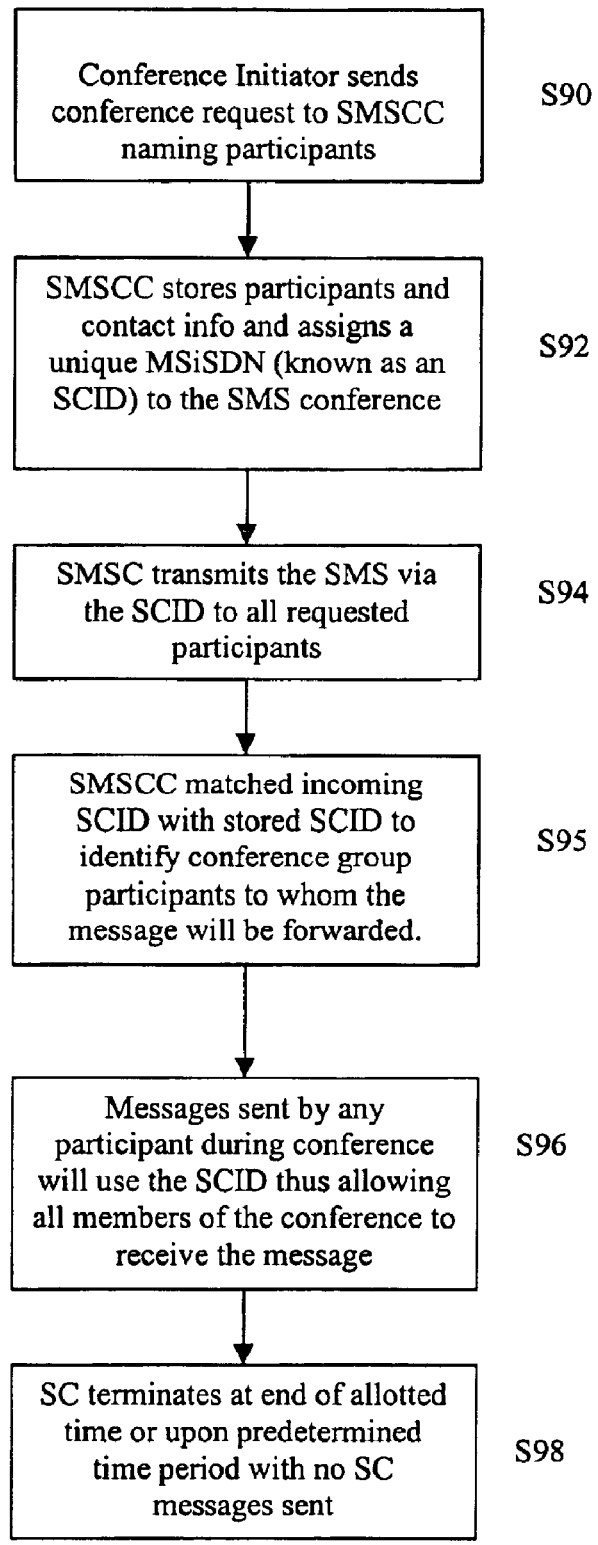
FIG. 6 is a flow chart illustrating the SMS conference of the present invention.

FIG. 6 depicts a flow chart showing the operations for establishing and participating in an SMS conference of the present invention. To initiate an SMS conference, the conference initiator sends an SMS conference request to the SMSCC by addressing the SMS to a designated SMS conference number or MSiSDN as shown in operation S90. The conference request may include a short message or the request may simply include the contact information for each possible conference participant.

In operation S92, the SMSCC receives the request and establishes an SMS conference by storing the participant's contact information and assigning a unique SCID to the conference group. The SMSC forwards the message, via the SCID, to the specified individuals inviting them to participate in the SMS conference as depicted in operation S94.

Upon establishing the SMS conference, any conference participant may transmit a short message to all other participants by sending a short message, via the SCID, to the SMSCC located in the SMSC. Using the SCID of the incoming message, the SMSCC locates the conference group associated with the SCID in operation S95. By matching the incoming SCID with a stored SCID, the SMSCC is able to determine to which group of conference participants the incoming message will be forwarded. As depicted in operation S96, conference participants may send a single message that will be delivered to all the other conference participants by addressing the message to the SCID. Accordingly, in operation S98, the SMS conference terminates at the end of a predetermined time period in which no short message is sent among conference participants.

As can be seen from the above description and figures, the SMS conference system of the present invention solves a limitation associated with conventional SMS messaging systems, namely that such systems only provide point-to-point communication. Thus, the SMS conference system of the present invention further enables people to remain in constant contact with one another by providing a system that enables many-to-many conversations utilizing SMS services.

What is claimed is:

1. A communication method comprising:
    initiating a Short Messaging Service (SMS) conference by transmitting a request to a control center wherein said request includes contact information for a plurality of conference participants;
    storing said contact information contained in said request as a conference group;
    assigning an SMS conference identifier ("SCID") to said conference group;
    transmitting an initial short message, using said assigned SCID, to said conference participants; and
    enabling said conference participants to transmit a reply short message to all conference participants by addressing said reply short message to the assigned SCID.

2. The communication method of claim 1, wherein at least one of said participants uses a mobile unit to participate in said SMS conference.

3. The communication method of claim 1, wherein at least one of said participants uses the Internet to participate in said SMS conference.

4. The communication method of claim 1, wherein the method is executed over a wireless network.

5. The communication method of claim 1, wherein the control center is a Short Message Service Center ("SMSC").

6. The communication method of claim 5, wherein the SMSC further includes an SMS Conference Center ("SCSCC") for storing said contact information for said conference participants and assigning said SCID to said conference group.

7. The communication method of claim 1, wherein the assigned SCID is an MSiSDN.

8. The communication method of claim 1, wherein the SMS conference is initiated via a request in an email format, and wherein said email contains said contact information.

9. The communication method of claim 1, wherein said SMS conference is initiated by a mobile unit, and wherein a conference initiator enters said contact information into said mobile unit.

10. The communication method of claim 1, wherein the SMS conference is initiated via the Internet, and wherein using an HTML-based form, said conference initiator enters said contact information.

11. The communication method of claim 1, further comprising addressing said reply short message to said assigned SCID.

12. The communication method of claim 1, wherein said SMSC forwards said initial short message to said conference participants using said contact participant's stored contact information.

13. The communication method of claim 1, wherein each of said conference participants views an incoming short message, forwarded by said SMSC, as being from said SCID.

14. The communication method of claim 13, wherein the reply short message sent by said conference participant to all conference participants using said SCID is received at said SMSC, and said SMSCC determines which conference group is assigned to said SCID.

15. The communication method of claim 14, wherein when a match is found between a received SCID and a stored SCID, the SMSC forwards a received reply message to each conference participant using said conference participant's stored contact information.

16. The communication method of claim 1, wherein said contact information includes at least one of said conference participant's phone number or MSiSDN.

17. The method of sending many-to-many messages in a wireless communication network of claim 16, wherein wireless application protocol ("WAP") is used as a conference request application.

18. The communication method of claim 1, wherein wireless application protocol ("WAP") is used as a conference request function.

19. A method of sending many-to-many messages in a wireless communication network, comprising:
    transmitting a Short Messaging Service (SMS) conference request including information concerning a plurality of conference participants; assigning an identification code to said SMS conference request, and transmitting an SMS message to said plurality of conference participants, wherein said identification code enables said conference participants to transmit a reply SMS message to the other conference participants by addressing said reply SMS message to said identification code.

20. The method of sending many-to-many messages in a wireless communication network of claim 19, wherein said contact information is a number.

21. The method of sending many-to-many messages in a wireless communication network of claim 19, wherein said contact information is an Internet address.

22. The method of sending many-to-many messages in a wireless communication network of claim 19, wherein said contact information is an alias name assigned to said phone number.

23. The method of sending many-to-many messages in a wireless communication network of claim 19, a wireless device is used to transmit said SMS message.

24. The method of sending many-to-many messages in a wireless communication network of claim 23, wherein said computer further includes email capabilities for transmitting an SMS conference request.

25. The method of sending many-to-many messages in a wireless communication network of claim 19, a computer is used to transmit said SMS message.

26. The method of sending many-to-many messages in a wireless communication network of claim 19, wherein the identification code identifies a conference group's contact information for said plurality of conference participants, and wherein once said SMS conference is initiated, a conference participant can transmit an reply SMS message to all conference participants by addressing the reply SMS message to the identification code.

27. A wireless system for enabling many-to-many communication via Short Messaging Service (SMS) comprising:

a subscriber station capable of initiating an SMS request;

a control center operable to receive said SMS request from said subscriber station and assign an identification code to said SMS request thereby identifying an SMS conference; and a delivery protocol operable to transmit an SMS message for said plurality of conference participants, wherein one of the plurality of conference participants can send a reply SMS message to remaining conference participants by addressing said SMS message to said identification code.

28. The wireless system for enabling many-to-many communication via SMS of claim 27, wherein said contact information is at least one of a phone number or an MSiSDN.

29. The wireless system for enabling many-to-many communication via SMS of claim 27, wherein said contact information is an alias name assigned to said at least one of said phone number or said MSiSDN.

30. The wireless system for enabling many-to-many communication via SMS of claim 27, wherein said subscriber station is a wireless device.

31. The wireless system for enabling many-to-many communication via SMS of claim 27, wherein said subscriber station is an Internet.

32. The wireless system for enabling many-to-many communication via SMS of claim 27, wherein said subscriber station is a computer.

33. The wireless system for enabling many-to-many communication via SMS of claim 32, wherein said computer further includes email capabilities for transmitting an SMS request.

34. The wireless system for enabling many-to-many communication via SMS of claim 27, wherein the control center is a Short Message Service Center ("SMSC").

35. The wireless system for enabling many-to-many communication via SMS of claim 34, wherein the SMSC further includes an SMS Conference Center ("SMSCC").

36. A computer program product for enabling a computer to engage in many-to-many communication via Short Messaging Service (SMS) comprising:

software instructions for enabling the computer to perform predetermined operations, and a computer readable medium bearing the software instructions; the predetermined operations including:

receiving an SMS request and assigning an SMS conference identifier ("SCID") to said SMS request;

transmitting an SMS message, using said SCID, to a plurality of conference participants; and enabling one of the conference participants to transmit an SMS message to the other conference participants by addressing said SMS message to the SCID.

37. A computer system adapted to facilitate many-to-many communication via Short Messaging Service (SMS), comprising: a processor, and a memory including software instructions adapted to enable the computer system to perform:

receiving an SMS request at a control center wherein said control center assigns an SMS conference identifier ("SCID") to said SMS request;

transmitting said SMS request, using said SCID, to at least one conference participant; and enabling said conference participant to transmit a short message to at least one other conference participant by addressing the short message to the SCID.

* * * * *